United States Patent
Bordignon et al.

[11] Patent Number: 5,380,146
[45] Date of Patent: Jan. 10, 1995

[54] MACHINE WITH HANDLING ASSEMBLIES TO PACKAGE LAYERS OF BARS

[75] Inventors: Giuseppe Bordignon, Bicinicco; Rolando Paolone, Buttrio; Ferruccio Tomat, Udine, all of Italy

[73] Assignee: Danieli & C. Officine Meccaniche SpA', Buttrio, Italy

[21] Appl. No.: 43,924

[22] Filed: Apr. 8, 1993

[30] Foreign Application Priority Data

Apr. 30, 1992 [IT] Italy .................. 92A 000079

[51] Int. Cl.$^6$ .................................. B65G 57/081
[52] U.S. Cl. ......................... 414/791.4; 198/430; 198/468.2; 414/788.3
[58] Field of Search ............ 414/788.3, 791.4, 794; 198/430, 468.2, 470.1, 476.1

[56] References Cited

U.S. PATENT DOCUMENTS 4,278,377 7/1981 Elineau .................... 414/791,4 X

FOREIGN PATENT DOCUMENTS

0412306 2/1991 European Pat. Off. ...... B65G 57/18
3116989 11/1982 Germany .................. B65G 57/081
2092091 8/1982 United Kingdom ............. 414/791.4

Primary Examiner—Michael S. Huppert
Assistant Examiner—Janice L. Krizek
Attorney, Agent, or Firm—Antonelli, Terry, Stout & Kruas

[57] ABSTRACT

Machine with handling assemblies to package layers of bars, which cooperates with a feeder conveyor (11) and with a collection and discharge device (35), the feeder conveyor (11) comprising a first coordinated plurality or stationary abutments (14a) to position a layer to be engaged containing "N" or "N−1" bars (13) alternately and a second coordinated plurality of movable abutments (14b) to position momentarily a waiting layer containing "N−1" or "N" bars (13), the machine including a drive shaft (17) located below the plane of, and at a terminal position of, the feeder conveyor (11) and at a right angle to the direction of feed of the feeder conveyor (11), the drive shaft (17) setting in rotation a plurality of non-inverting rotary arms (21), each of which rotary arms (21) bears a non-inverting handling assembly (18) always kept substantially horizontal, the drive shaft (17) setting directly in rotation a substantially coaxial plurality of rotary spindles (16) parallel to the drive shaft (17), each of the spindles (16) being associated with an inverting handling assembly (19) comprising first and second claws (24a–24b) which have a first position for engagement, conveying and inverting (33a) and a second position for delivery and retraction (33b).

10 Claims, 5 Drawing Sheets fig.1 fig. 2 fig.6 fig. 9 fig. 7 fig. 8

MACHINE WITH HANDLING ASSEMBLIES TO PACKAGE LAYERS OF BARS

BACKGROUND OF THE INVENTION

This invention concerns a machine with handling assemblies to package layers of bars.

To be more exact, the invention concerns a machine with handling assemblies which is suitable to engage layers of bars arriving continuously on a conveyor belt, to overturn every second layer by 180° about the lengthwise axis of the layer and to package the layers in appropriate collection positions so as to form packages of alternate non-inverted/inverted layers.

By the word "bars" hereinafter are meant bars having a simple profile or bars of a complex figure or sections.

To be more exact, the packaging machine with handling assemblies comprises two pluralities of handling assemblies, each assembly being able to rotate about its own axis to engage and deliver the layers of bars.

The packaging machine with handling assemblies according to the invention is especially advantageous for the stacking of layers of angle irons since it enables the angle irons to be fitted on each other in a vertical direction.

The packaging machine with handling assemblies according to the invention is applied advantageously in a packaging zone downstream of a production line, especially a rolling line.

The state of the art covers machines to package bars, whether the bars are rolled or extruded, flat or sections, etc.

DE-B-1.183.020 discloses a device to stack bars, whereby each layer has to be overturned by 180° about the lengthwise axis of the bars so that packages can be formed with the layers fitted one on top of another. This device comprises a lifting rake which conveys the bars onto a depositing table which can be moved by a link guide. Orientable arms equipped with electromagnets take the bars from the depositing table and arrange them on a stacking bench.

Other devices to stack rolled bars by using electromagnets able to lift the bars or rolled sections are disclosed in DE-B-1.235.811, DE-B-1.258.796 and DE-B-31.296.578. All the above known devices entail drawbacks and shortcomings due to the complexity and cost of the lifting and conveying elements and the relatively long conveying times, which generally do not permit continuous engagement of bars arriving from the feeder conveyor belt.

This entails delays and downtimes in the subsequent shops in view of the high speeds of modern rolling trains and resulting high output.

Moreover, the known systems have a great overall bulk, take up a large area and entail high maintenance costs owing to the complexity of the mechanisms, long cycle times, heavy working costs and considerable installed power.

IT-A-83465/89 discloses a rotary packaging machine fed with defined layers of bars; the machine comprises a plurality of pairs of claws able to rotate about a lengthwise axis parallel to the package being formed; the claws lie on a plane passing through that axis and radial thereto; the axis of rotation lies between the two planes of axial arrival of the sections, and the claws are secured to rotary means.

This solution entails the shortcoming that, when packages are being formed with alternate non-inverted/inverted layers, the bars have to reach the packaging machine already formed in two layers face to face and butted but suitably separated sideways, thus increasing the overall lateral bulk of the device. Moreover, the above packaging machine is fed by feeding lengthwise the bars to be packaged, and this involves long cycle times when the sections have a considerable length.

IT-B-1.221.723 discloses a device to stack layers of bars which entails the problem of forming only packages in which none of the layers are inverted.

SUMMARY OF THE INVENTION

To overcome the shortcomings of the state of the art and to achieve further advantages, the present applicants have designed, tested and embodied this invention.

The packaging machine with handling assemblies according to the invention is fitted in a production line at the terminal part of a feeder conveyor upstream of a stacking means.

The packaging machine with handling assemblies continuously engages defined layers of "N" or "N−1" bars arriving on the feeder conveyor and delivers these layers, while overturning the alternate bonding layers, to a stacking means so as to form packages consisting of alternate non-inverted/inverted layers.

The layers of bars are halted in their engagement zone by a first coordinated plurality of stationary abutments cooperating with the feeder conveyor; the engagement zone is the same for the layers not inverted as for the layers to be inverted.

A butting means of a known type, whether stationary or movable, is positioned at the side of the feeder conveyor and cooperates with the engagement zone; it ensures transverse alignment of the bars forming the layer to be engaged.

A second coordinated retractable plurality of abutments cooperating with the feeder conveyor upstream of the first plurality of abutments obstructs momentarily on the feeder conveyor in a known manner the bars following the layer to be engaged.

This second plurality of abutments cooperates advantageously with a means to count the bars, so as to feed defined layers already arranged for engagement to the packaging machine continuously.

To be more exact, the counting means supplies the packaging machine and its handling assemblies with defined layers of "N" bars and defined layers of "N−1" bars alternately in sequence.

In the description that follows the components relative to the engagement and delivery means which deliver a layer of bars positioned as when engaged will be described as "non-inverting", whereas the components which deliver a layer of bars overturned by 180° about its lengthwise axis will be described as "inverting".

The packaging machine according to the invention comprises a plurality of inverting and non-inverting rotary handling assemblies, which engage respectively in sequence a layer to be delivered non-inverted and a layer to be inverted from the feeder conveyor and deliver those layers to the stacking means.

The non-inverting rotary handling assemblies are secured to the free end of a non-inverting rotary arm; the packaging machine comprises a plurality of these non-inverting rotary arms.

The other end of the non-inverting rotary arm is solidly fixed to a drive shaft, which is positioned parallel to the axis of the bars and extends advantageously across the whole width of the feeder conveyor, the bars being positioned at a right angle to the direction of movement of the conveyor.

The non-inverting rotary handling assemblies consist of single claws pivoted on the end of the relative non-inverting rotary arm so as to stay always substantially horizontal during rotation of the non-inverting rotary arm.

The non-inverting claws have an engagement position, in which they are turned towards the rotary drive shaft and parallel to the plane of conveying of the feeder conveyor, and a delivery and retracted position, in which they are enabled to be retracted out of contact with the layer of the bars. This retraction is achieved with a lateral rotation of the claw.

According to a variant the retraction is achieved with an axial withdrawal of the claw.

The inverting handling assemblies consist of a plurality of pairs of parallel, facing engagement claws, and at least one engagement claw of each pair can move in a direction substantially perpendicular to the plane of the layer of bars so as to clamp the layer taken from the feeder conveyor between that claw and the other claw forming the pair of claws.

These pairs of inverting claws have the task of engaging, inverting and delivering the inverted layer to the package being formed.

The inverting handling assemblies are supported and set in rotation by an independent sprocket wheel connected by a chain, or belt, to an analogous sprocket wheel integral with the drive shaft.

The rotation of the drive shaft, therefore, sets in rotation the non-inverting handling assemblies and the inverting handling assemblies at the same time in coordination.

The claws of the inverting handling assemblies too are retractable advantageously, but not only, sideways so as not to contact the layer of bars during the delivery of that layer to the stacking means and so as not to contact the drive shaft during the re-positioning of the claws in the engagement zone.

In the engagement position of the inverting handling assemblies it is the upper claw of the pair that cooperates with the feeder conveyor, whereas in delivery position, after a rotation of substantially 180° of the inverting handling assembly, it is the lower mating claw that cooperates with the stacking means.

The stacking means located downstream of the drive shaft consists of a means to collect and discharge packages as they are formed and may be a roller conveyor, for instance.

According to a variant a means to engage and deliver layers cooperates with the means to collect and discharge packages.

The means to collect and discharge packages cooperates directly, or through the means to engage and deliver layers, with the non-inverting and inverting rotary handling assemblies, receives one layer at a time, which will be alternately a non-inverted layer and a layer inverted by 180° about its lengthwise axis, and delivers these layers one at a time to the collection and discharge means.

The engagement and delivery means consists of a pair of gripper plates which have a delivery position, in which they lie substantially opposed and parallel, and an engagement position, in which the upper gripper plate is enabled to be retracted so as to allow the lower gripper plate to accommodate the layer of bars engaged.

In the engagement position the lower gripper plate of the engagement and delivery means cooperates alternately with the non-inverted and inverted rotary handling assemblies and receives continuously therefrom respectively a non-inverted layer and a layer inverted by 180°. As soon as a layer has been placed on the lower gripper plate, the upper gripper plate is brought substantially parallel to the lower gripper plate and is displaced on a plane perpendicular to the plane of the layer of bars so as to clamp the layer before the latter is released by the non-inverting or inverting handling assemblies.

The clamping of the layer between the gripper plates of the engagement and delivery means ensures the transverse alignment of the bars during the sideways retraction of the non-inverting or inverting handling assemblies; otherwise that sideways retraction would cause a movement of misalignment of the bars forming the layer.

So as to delivery the layer to the collection and discharge means, the upper and lower gripper plates are enabled to be retracted from contact with the bars by axial withdrawal from the collection and removal means. The package being formed within the collection means is supported, for instance, by vertically movable arms suitable to displace the package being formed step by step as necessary and to deliver the package to discharge means consisting, for instance, of a roller conveyor.

BRIEF DESCRIPTION OF THE DRAWINGS

The attached figures, which are given as a non-restrictive example, show some preferred embodiments of the invention as follows.

DETAILED DESCRIPTION OF THE PREFERRED EMBODIMENTS

In the figures the reference number 10 indicates a machine to package layers of bars and/or sections according to the invention.

The packaging machine 10 according to the invention cooperates with a feeder conveyor 11 and is employed advantageously to form packages 12 the bars 13 of which have to be packaged by alternating a non-inverted layer with an inverted layer.

The feeder conveyor 11 consists of a plurality of conveyor elements 11a bearing bars 13 positioned substantially at a right angle to the direction of movement of the feeder conveyor 11.

A first plurality of stationary abutments 14a cooperates with the feeder conveyor 11 and determines a zone 15 of engagement of a layer of bars 13 on the conveyor 11.

Figure 1:
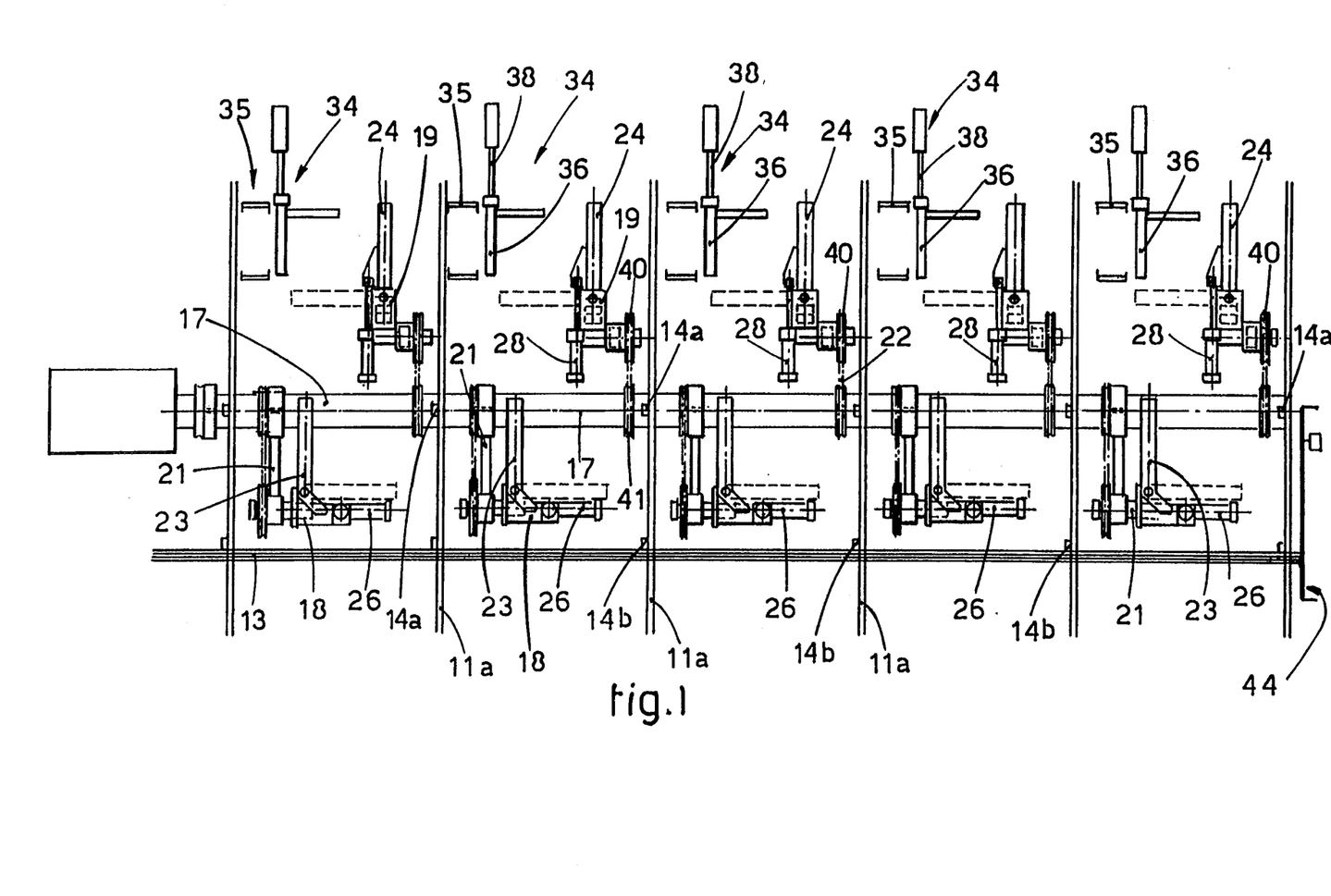
FIG. 1 shows from above with a diagram a production plant in which the packaging machine according to the invention is installed downstream of a production line.

A butting or flanking element 44 (see FIG. 1) of a known type arranged along the side of the most outward conveyor element 11a of the feeder conveyor 11 may cooperate with the engagement zone 15. This butting or flanking element 44 ensures butting alignment of the bars 13 forming the layer to be engaged and may be of a stationary or movable type.

A second plurality of abutments 14b cooperates with the feeder conveyor 11 upstream of the engagement zone 15 and obstructs on the conveyor 11 the bars 13 subsequent to the layer being engaged. These abutments 14b are retractable, when necessary, to allow forward movement of the layer of bars 13 successive to the layer being engaged into the engagement zone 15.

A means to count bars 13, which is of a known type and is not shown in the figures, cooperates advantageously with the second plurality of retractable abutments 14b so as to pre-arrange continuously and alternately layers consisting of "N" or "N−1" bars respectively.

The packaging machine 10 with handling assemblies according to the invention cooperates with a drive shaft 17 positioned in this case below the feeder conveyor 11 and parallel to the plane of the conveyor 11 and substantially at a right angle to the direction of movement of the same.

The drive shaft 17 supports and moves a plurality of rotary handling assemblies, which are non-inverting 18 and inverting 19 assemblies respectively and are suitable to engage the layers of bars 13 alternately, one at a time, so as to transfer the layers non-inverted and inverted alternately respectively to a stacking means 20.

To be more exact, the non-inverting rotary handling assemblies 18 are fitted to the free ends of non-inverting rotary arms 21, of which a plurality is comprised.

The non-inverting rotary arm 21 is fitted with its other end in a substantially radial direction to the drive shaft 17.

The non-inverting handling assemblies 18 consist of single claws 23 secured to the relative non-inverting rotary arm 21 in such a way that they always stay substantially horizontal during rotation of the non-inverting rotary arm 21.

The non-inverting handling assemblies 18 are equipped with a means, in this example a cylinder/piston actuator 26 which acts on an extension 27 of the claw 23 (see FIG. 7) and enables the claw 23 to rotate sideways, substantially by 90°, about a pivot 30 so as to be retracted from contact with the layer of bars 13 during delivery of the same to the stacking means 20.

Figure 7:
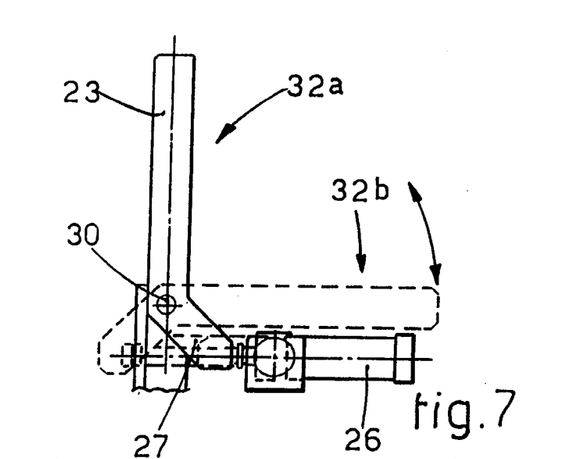
FIG. 7 is a view from above of the non-inverting handling assembly.

The cylinder/piston actuator 26 arranges also, during rotation of the non-inverting rotary arm 21, to bring the claw 23 back to the engagement position by rotating the claw 23 substantially by 90° in the opposite direction.

It is thus possible to determine for the claw 23 (see FIG. 7) a first engagement and conveying position 32a, in which the claw 23 takes the bars 13 from the feeder conveyor 11 and conveys them and in which the claw 23 is substantially normal to the bars 13, and a second delivery and retraction position 32b drawn with dashes in the figure, in which the claw 23 is substantially parallel to the bars 13, this position 32b being suitable to deliver the bars 13 and to return to the engagement zone 15.

The inverting handling assemblies 19 consist of a pair of parallel, opposed claws 24, namely a lower 24a and upper 24b claw respectively.

The inverting handling assemblies 19 rotate about a spindle 16 supported by a suitable base 39 from their engagement position to their delivery position.

Figure 6:
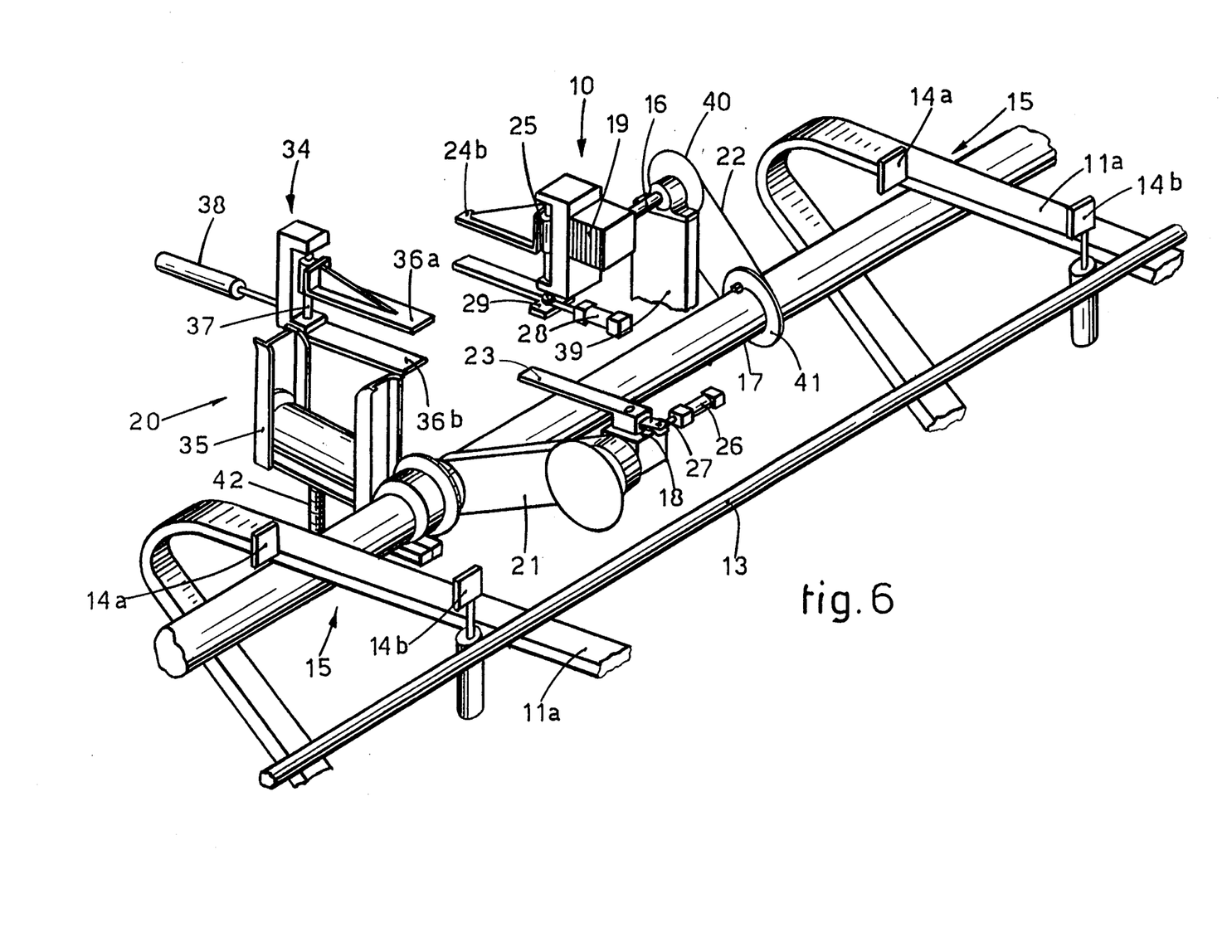
FIG. 6 is a three-dimensional view of the packaging machine with handling assemblies according to the invention.

The spindle 16 is integrally fixed to a sprocket wheel 40 which cooperates with an analogous sprocket wheel 41, integrally fixed to the drive shaft 17, by means of a chain or toothed belt 22 (FIG. 6).

Thus, the rotation of the drive shaft 17 sets in rotation the non-inverting 18 and inverting 19 handling assemblies at the same time in coordination.

At least one of the two inverting claws 24 can move at a right angle to the plane of sliding of the bars 13 on the conveyor 11.

In this example the upper claw 24b is actuated by a jack 25, which, when the layer of bars 13 has been taken from the feeder conveyor 11, displaces the upper claw 24b to enable the layer to be clamped between the upper 24b and lower 24a claws during rotation of the relative inverting, rotary handling assembly 19.

It is possible to determine for the inverting claws 24 an engagement position with the claws 24 open and an inverting and conveying position with the claws 24 closed.

Figure 8:
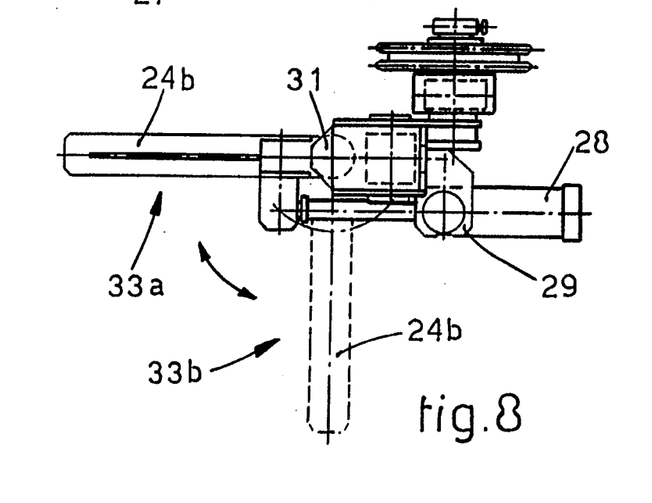
FIG. 8 is a view from above of the inverting handling assembly.

The inverting handling assembly 19 too cooperates with a relative actuator 28, which by acting on a suitable extension 29 of the lower claw 24a solidly fixed torsionally to the upper claw 24b causes the claws 24a–24b to rotate substantially by 90° about a pivot 31 (see FIG. 8) when the layer of bars 13 has been delivered to the stacking means 20.

In this way, in a manner analogous to that of the single non-inverting claw 23, it is possible to determine for the pair of inverting claws 24 a first engagement, conveying and inverting position 33a (see FIG. 8) with the claws 24 substantially orthogonal to the bars 13 and a second delivery and retracted position 33b with the claws 24 substantially parallel to the bars 13.

Figure 9:
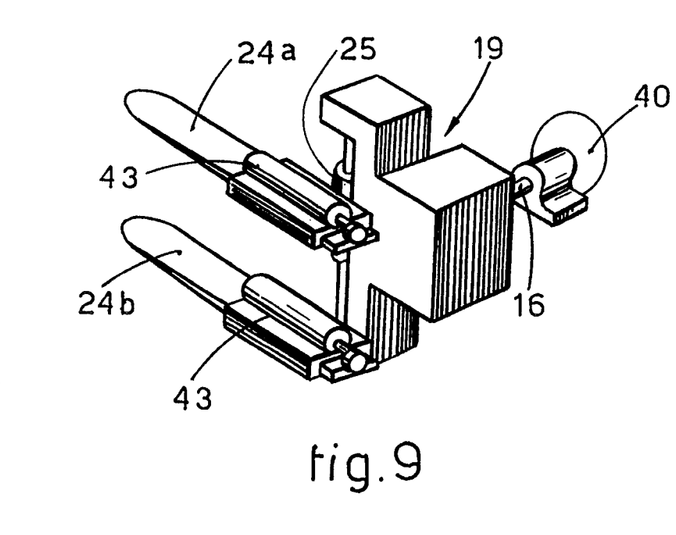
FIG. 9 is a three-dimensional view of a variant of the embodiment of the invention.

According to a variant shown in FIG. 9 both the inverting claws 24 are provided with jacks 43 able to cause an axial withdrawal of those claws 24 when the layer of bars 13 has been delivered to the stacking means 20. This variant can be applied likewise to the non-inverting claw 23 of the non-inverting handling means 18.

Figure 2:
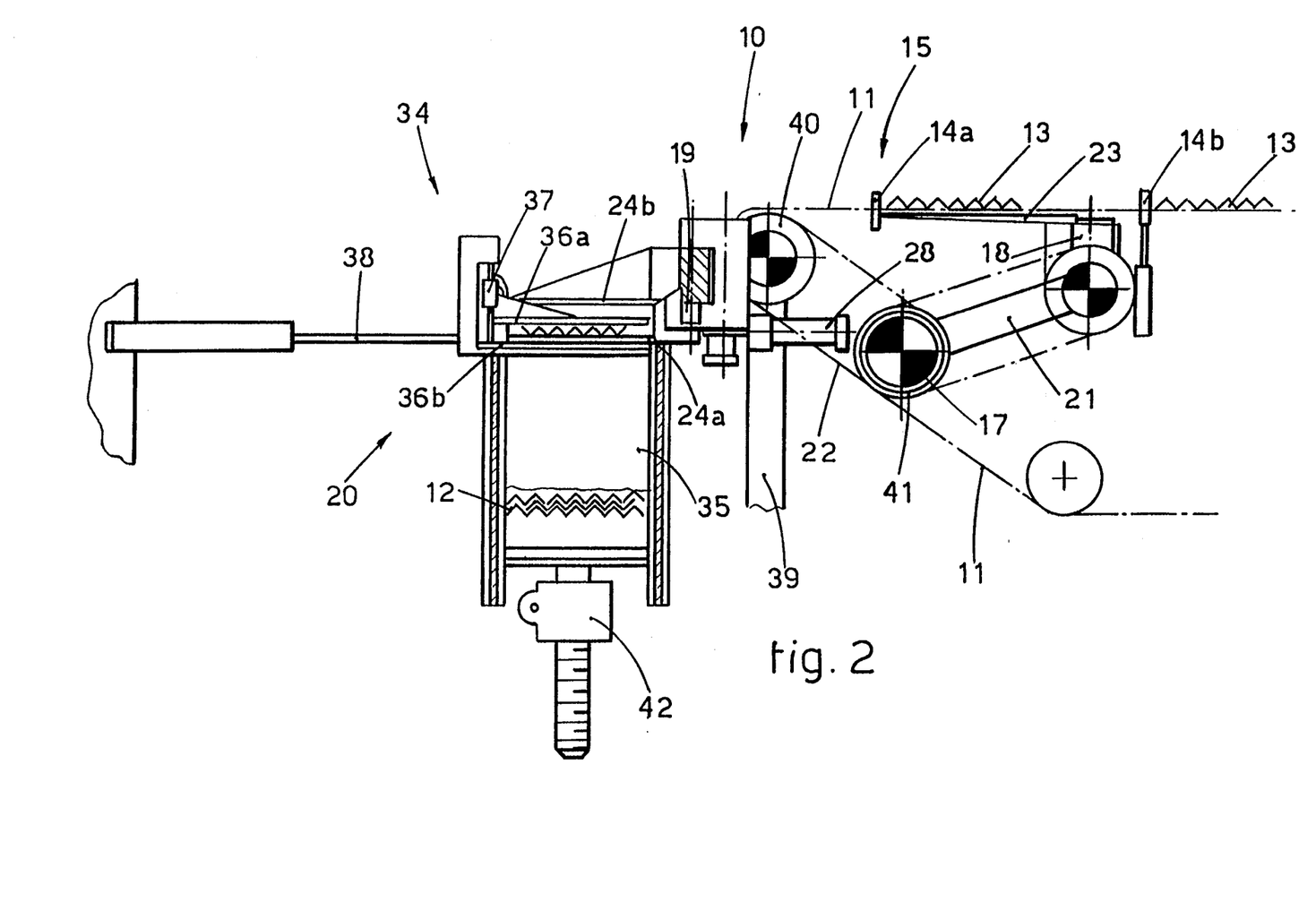
FIGS. 2, 3, 4 and 5 show the steps of the working cycle of the packaging machine with handling assemblies according to the invention.

The complete cycle of engagement and delivery of the layers of bars 13 is shown in FIGS. 2, 3, 4 and 5. For the sake of simplicity of illustration the stacking means 20 are shown in FIG. 2 alone.

The non-inverting handling assembly 18 in the position of FIG. 2 is ready to take a non-inverted layer of bars 13 from the conveyor 11, while the inverting handling assembly 19 is in its position to deliver an inverted layer of bars 13 to the stacking means 20; this delivery takes place with the inverting claws 24 open.

Figures 3, 4, 5:
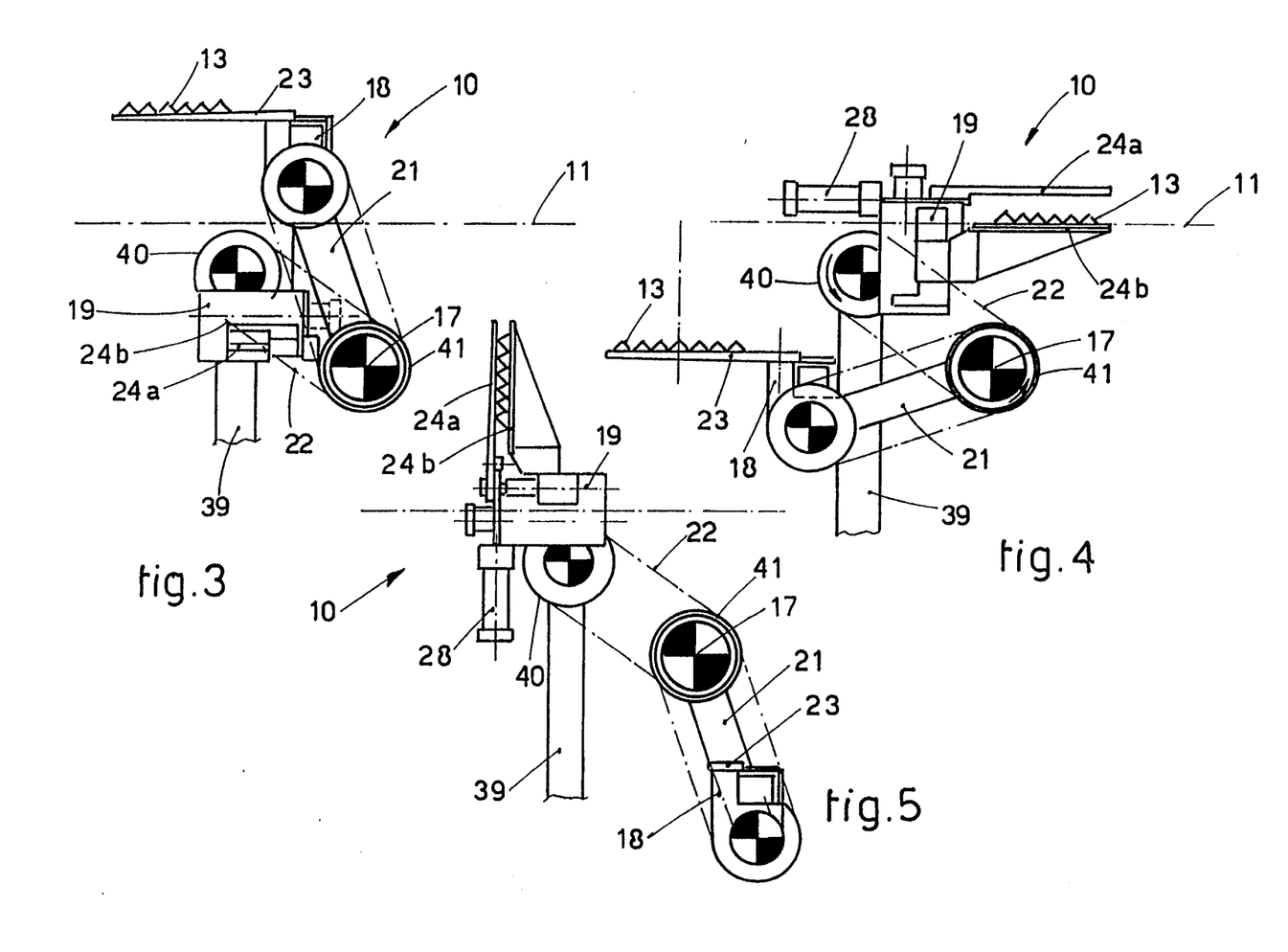

The non-inverting handling assembly 18 in the position of FIG. 3 has engaged the non-inverted layer and is rotating to cooperate with the stacking means 20.

The inverting handling means 19 has delivered its inverted layer and is rotating to cooperate with the new layer positioned on the conveyor 11.

The inverting claws 24 are in their delivery and retracted position 33b, which they occupy to free themselves from contact with the layer of bars 13 during delivery.

In the position of FIG. 4 the non-inverting handling means 18 is ready to deliver the non-inverted layer of bars 13 to the stacking means 20, while the inverting handling means 19 is ready to engage the new layer of bars 13 to be delivered inverted to the stacking means 20.

The engagement of the layer to be inverted is carried out by making the lower inverting claw 24b cooperate with the layer of bars 13 on the conveyor 11 and by then displacing the lower claw 24b in a direction perpendicular to the upper claw 24a so as to close the two inverting claws 24 together; in this position the claws 24 grip the layer of bars 13 during rotation of the respective inverting handling assembly 19.

Lastly, in the position of FIG. 5 the non-inverting handling means 18 is moving to cooperate with the conveyor 11 in engaging a new non-inverted layer of bars 13. The non-inverting claw 23 is rotated by 90° to reach the delivery and retracted position 32b so as to be free of contact with the layer during delivery.

The inverting handling assembly 19, having engaged a layer to be delivered inverted, is rotating to come into cooperation with the stacking means 20.

The next step in the cycle is that shown in FIG. 2.

In this example the stacking means 20 consists of an engagement and delivery means 34 and of a means 35 to collect and discharge packages 12 being formed.

The engagement and delivery means 34 consists of a pair of gripper plates 36, an upper 36a and a lower 36b plate respectively, at least one of which can be moved on a plane at a right angle to the plane of sliding of the bars 13.

The engagement and delivery means 34 accommodates one layer of bars 13 at a time taken alternately from the non-inverting 18 and inverting 19 rotary handling assemblies by means of alternate cooperation of the lower gripper plate 36b with the non-inverting claw 23 and with the pair of inverting claws 24.

To actuate this cooperation, the upper gripper plate 36a has been retracted sideways by being rotated substantially by 90° so as not to contact the layer of bars 13 during delivery of that layer by the non-inverting rotary handling assembly 18 or by the inverting rotary handling assembly 19 to the lower gripper plate 36b of the engagement and delivery means 34.

When the layer of bars 13 has been received, the upper gripper plate 36a is returned to a position substantially parallel to, and facing, the lower gripper plate 36b and is moved by a jack 37 in a direction at a right angle to the bars 13 so as to grip the layer against the lower gripper plate 36b.

In this position, which ensures transverse alignment of the bars 13 during the step of sideways retraction of the non-inverting 18 and inverting 19 rotary handling assemblies, the layer is released to the collection and discharge means 35.

To actuate this step, the engagement and delivery means 34 is equipped with a means, an actuator 38 in this case, which enables the gripper plates 36 to be withdrawn from contact with the bars 13 by means of axial withdrawal of the plates 36 from the layer of bars 13 and from the collection and discharge means 35.

The collection and discharge means 35 is equipped with means such as lateral abutment means and vertically movable rollers 42 able to displace the package 12 being formed step by step as required and to deliver the package 12 to the discharge means.

We claim:

1. Machine with handling assemblies to package layers of bars, the machine cooperating with a feeder conveyor and with collection and discharge means, the feeder conveyor comprising a first coordinated plurality of stationary abutments to position a layer to be engaged containing "N" or "N−1" bars alternately and a second coordinated plurality of movable abutments to position momentarily a waiting layer containing "N−1" or "N" bars, the machine comprising a drive shaft located below the plane of, and at a terminal end of, the feeder conveyor and at a right angle to the direction of feed of the feeder conveyor; a plurality of non-inverting rotary arms operably connected to and set in rotation by the drive shaft, each of the rotary arms bearing a non-inverting handling assembly always kept substantially horizontal, the non-inverting handling assemblies having a first layer engagement and conveying position and a second delivery and retracted position; a plurality of rotary spindles extending parallel to the drive shaft and operably connected to the drive shaft such that the rotary spindles can be set in rotation by the drive shaft; a plurality of inverting handling assemblies, each inverting handling assembly being operably connected to and set in rotation by a respective one of the plurality of rotary spindles, each inverting handing assembly comprising first and second claws which have a first position for layer engagement, conveying and inverting, and a second position for delivery and retraction, the plurality of spindles being positioned below the feeder conveyor and in a position substantially between a layer engagement zone and a layer delivery zone, the non-inverting handling assembly and the inverting handling assembly having alternately a position coordinated with the layer engagement zone and with the layer delivery zone.

2. Machine as in claim 1, in which the collection and discharge means comprise an engagement and delivery means cooperating momentarily with the non-inverting handling assembly and the inverting handling assembly.

3. Machine as in claim 1, in which the non-inverting handling assembly comprises a claw longitudinally extending in a first horizontal direction, the claw being retractable by being pivoted in a horizontal plane about a pivot provided at one end of the claw.

4. Machine as in claim 1, in which the non-inverting handling assembly comprises a claw longitudinally extending in a first horizontal direction, the claw being retractable longitudinally along said horizontal direction.

5. Machine as in claim 1, in which the inverting handling assembly comprises a pair of parallel opposed claws, at least one of the claws being pivotable about a pivot provided at an end thereof.

6. Machine as in claim 1, in which the inverting handling assembly comprises a pair of parallel opposed claws, the claws being retractable along longitudinal axes thereof.

7. Machine as in claim 1, in which the inverting handling assembly has an upper claw able to move in a direction substantially perpendicular to a lower claw.

8. Machine as in claim 2, in which the engagement and delivery means is able to move in a direction perpendicular and substantially parallel to a plane on which the layer of bars lies on the engagement and delivery means.

9. Machine as in claim 2, in which the engagement and delivery means comprises a gripper plate able to move in a direction substantially perpendicular to a lower gripper plate.

10. An apparatus for packaging layers of bars, comprising:

a feeder conveyor, the feeder conveyor comprising a first coordinated plurality of stationary abutments to position in a layer engagement zone a layer to be engaged containing "N" or "N−1" bars alternately and a second coordinated plurality of movable abutments to position momentarily a waiting layer containing "N−1" or "N" bars;

a collection and discharge device to collect packaged layers of bars and discharge the packaged layers, the collection and discharge device having a layer delivery zone in which layers of bars are delivered;

a drive shaft located below the plane of, and at a terminal end of, the feeder conveyor and at a right angle to the direction of feed of the feeder conveyor;

a plurality of non-inverting rotary arms operably connected to and set in rotation by the drive shaft, each of the rotary arms bearing a non-inverting handling assembly always kept substantially horizontal, the non-inverting handling assemblies having a first layer engagement and conveying position and a second delivery and retracted position;

a plurality of rotary spindles extending parallel to the drive shaft and operably connected to the drive shaft such that the rotary spindles can be set in rotation by the drive shaft; and a plurality of inverting handling assemblies, each inverting handling assembly being operably connected to and set in rotation by a respective one of the plurality of rotary spindles, each inverting and handling assembly comprising first and second claws which have a first position for layer engagement, conveying and inverting, and a second position for delivery and retraction, the plurality of spindles being positioned below the feeder conveyor and in a position substantially between a layer engagement zone and a layer delivery zone, the non-inverting handling assembly and the inverting handling assembly having alternately a position coordinated with the layer engagement zone and with the layer delivery zone.

* * * * *